United States Patent [19]
Levy

[11] Patent Number: 6,041,427
[45] Date of Patent: Mar. 21, 2000

[54] SCAN TESTABLE CIRCUIT ARRANGEMENT

[75] Inventor: Paul S. Levy, Chandler, Ariz.

[73] Assignee: VLSI Technology, San Jose, Calif.

[21] Appl. No.: 08/958,530

[22] Filed: Oct. 27, 1997

[51] Int. Cl.[7] .................................................. G01R 31/28
[52] U.S. Cl. ........................ 714/724; 370/241; 370/911
[58] Field of Search ................................. 714/724, 726,
714/727, 729, 733, 734, 30, 25, 27; 370/241,
911

[56] References Cited

U.S. PATENT DOCUMENTS

| | | | |
|---|---|---|---|
| 4,357,703 | 11/1982 | Brunt | 714/733 |
| 4,625,310 | 11/1986 | Mercer | 714/724 |
| 4,926,424 | 5/1990 | Maeno | 714/726 |
| 5,161,160 | 11/1992 | Yaguchi et al. | 714/729 |
| 5,471,481 | 11/1995 | Okumoto et al. | 714/727 |

*Primary Examiner*—Trinh L. Tu

[57] ABSTRACT

A circuit arrangement utilizes a common bus for functional operations of logic circuits and for scan testing the logic circuits. In one embodiment, input/output ports and scan test ports of the logic circuits are switchably coupled to a bus. For functionally testing the logic circuits, a predetermined command transmitted over the bus causes the scan test ports to be coupled to the bus and the input/output ports to be decoupled from the bus. Test data may then be transmitted to and from the logic circuits via the bus. When testing is complete, a second predetermined command transmitted over the bus causes the scan test ports to be decoupled from the bus and the input/output ports to be coupled to the bus.

25 Claims, 7 Drawing Sheets

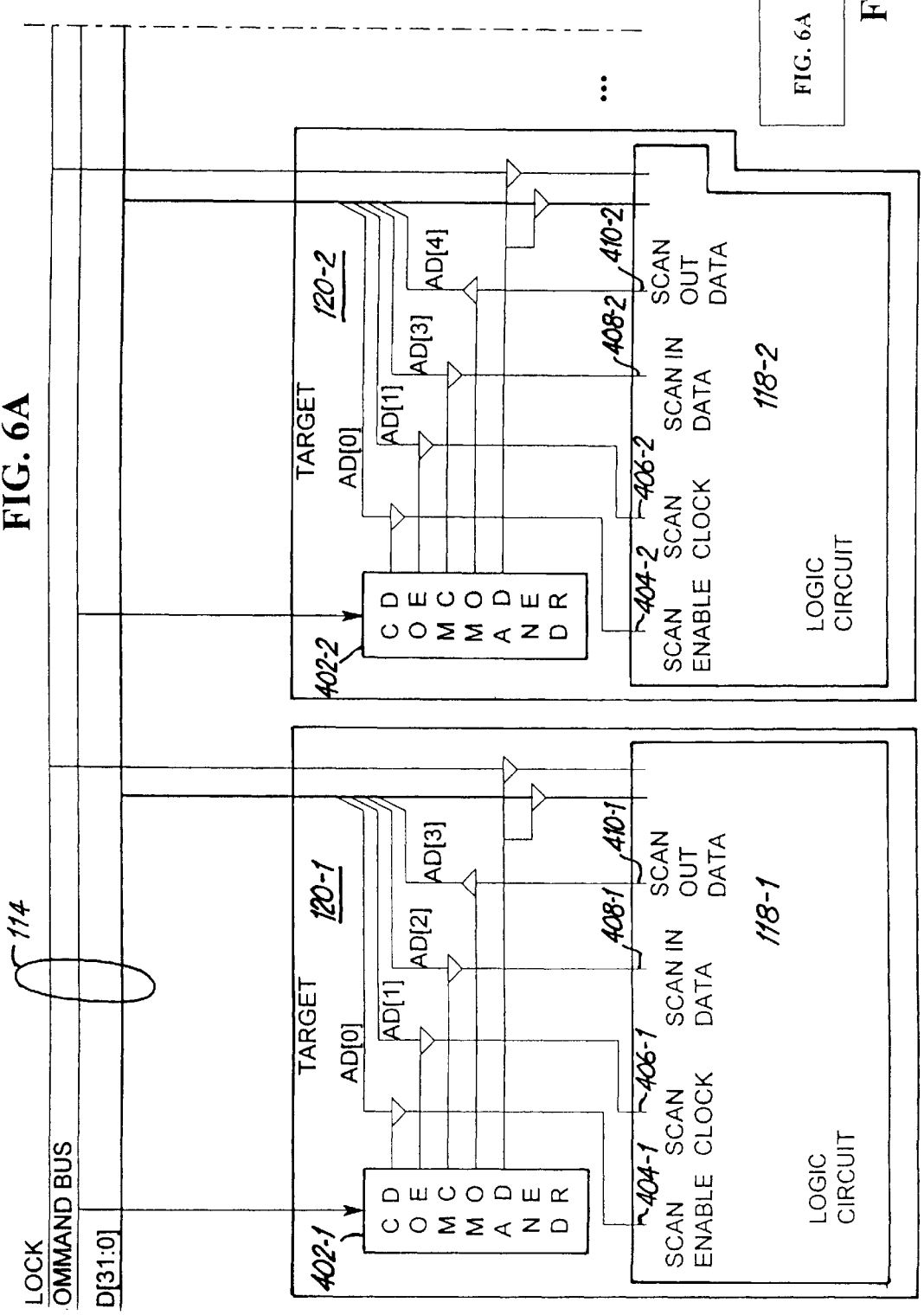

SCAN TESTABLE CIRCUIT ARRANGEMENT

FIELD OF THE INVENTION

The present invention relates to circuit arrangements for functionally testing logic circuits, and more particularly to a circuit arrangement for utilizing a common bus for functional operations of the logic circuits and for scan testing the logic circuits.

BACKGROUND

Testing a logic circuit is often performed by loading test data into the logic circuit and, in a controlled manner, advancing the logic circuit from state to state. Various test data is output from the logic circuit and examined to determine whether the logic circuit is functioning as expected. Special scan test input/output pins are often provided for the input and output of the test data. Both parallel and serial designs exist for scanning-in and scanning-out test data via the scan test input/output pins. Parallel designs decrease the time required to load test data and read test results at the expense of increased pin resources. Serial designs conserve pin resources, but require additional time to load test data and read test results as compared to parallel designs.

Increasing levels of circuit integration create at least two problems for scan testing logic circuits. First, as the number of functional blocks of logic circuits on a chip increases, the length of scan paths and the quantity of test data increase. Increased scan paths create layout complexity and increase costs, and more test data typically leads to increased test complexity. A second problem is that a greater number of functional blocks of logic circuits on a chip creates increased demand for input/output pins for circuit access during normal operation, thereby competing with input/output pins used exclusively for scan testing.

Cost-effective and efficient solutions for scan testing are highly desirable for the aforementioned reasons. However, present designs often trade pin resources against test time in implementing a desired level of cost-effectiveness and efficiency.

SUMMARY

The present invention is generally directed to a circuit arrangement and method that provides for functional testing of logic circuits, where a common bus is used for both a test mode and for a normal operational mode.

Consistent with one aspect of the present invention, a scan testable circuit arrangement includes a bus; a plurality of logic circuits having scan test ports input/output ports; a first plurality of switches, each having a first terminal coupled to a predetermined signal line of the bus and a second terminal coupled to a respective one of scan test ports of the logic circuits; a second plurality of switches, each having a first terminal coupled to a predetermined signal line of the bus and a second terminal coupled to a respective one of input/output ports of the logic circuits; and a plurality of command decoders coupled to the bus for receiving bus commands and coupled to the gates of the first and second plurality of switches, responsive to a first set of commands for coupling the scan test ports to the bus for a first operational mode, and responsive to a second set of commands for coupling the input/output ports to the bus for a second operational mode.

In another aspect of the invention, the scan test ports of each of the logic circuits are switchably coupled to a predetermined set of lines of the bus, each set respectively dedicated to one of the logic circuits.

Consistent with yet another aspect of the invention, the logic circuits are organized into a plurality of groups, each group including predetermined ones of the logic circuits and predetermined ones of the command decoders, the first set of bus commands including respective codes for specifying each of the groups and the command decoders responsive to the respective codes, whereby each group is individually selectable for scan testing.

In yet another aspect of the invention, the plurality of scan test ports include scan enable ports and scan clock ports, scan-in data ports, and scan-out data ports, the scan enable ports of the logic circuits switchably coupled to a predetermined first line of the bus, the scan clock ports of the logic circuits switchably coupled to a predetermined second line of the bus, the scan-in data port of a predetermined first one of the logic circuits switchably coupled to a predetermined third line of the bus, the scan-out data port of the first one of the logic circuits switchably coupled to a predetermined fourth line of the bus, the scan-in data port of each of the others of the logic circuits switchably coupled to the scan-out data port of another of the logic circuits via one of the lines of the bus, and the scan-output port of a predetermined last one of the logic circuits switchably coupled a predetermined fifth line of the bus.

According to another aspect of the invention, a method is provided for scan testing logic circuits. The method involves transmitting via a first bus a first command code to logic circuits that are coupled to the first bus; coupling scan test ports of the logic circuits to the first bus in response to the first command code; decoupling input/output circuits of the logic circuits from the first bus in response to the first command; inputting predetermined test data to the logic circuits via the bus; outputting data resulting from a test via the first bus; transmitting via the first bus a second command code to the logic circuits; decoupling scan test ports of the logic circuits from the first bus in response to the second command; and coupling input/output circuits of the logic circuits to the first bus in response to the second command.

The above summary of the present invention is not intended to provide an overview of each illustrated embodiment of the present invention. From the figures and the detailed description which follow, other advantages and aspects of the present invention will become apparent.

BRIEF DESCRIPTION OF THE DRAWINGS

The invention may be more completely understood in consideration of the detailed description of various embodiments of the invention which follows in connection with the accompanying drawings, in which.

Figure 1:
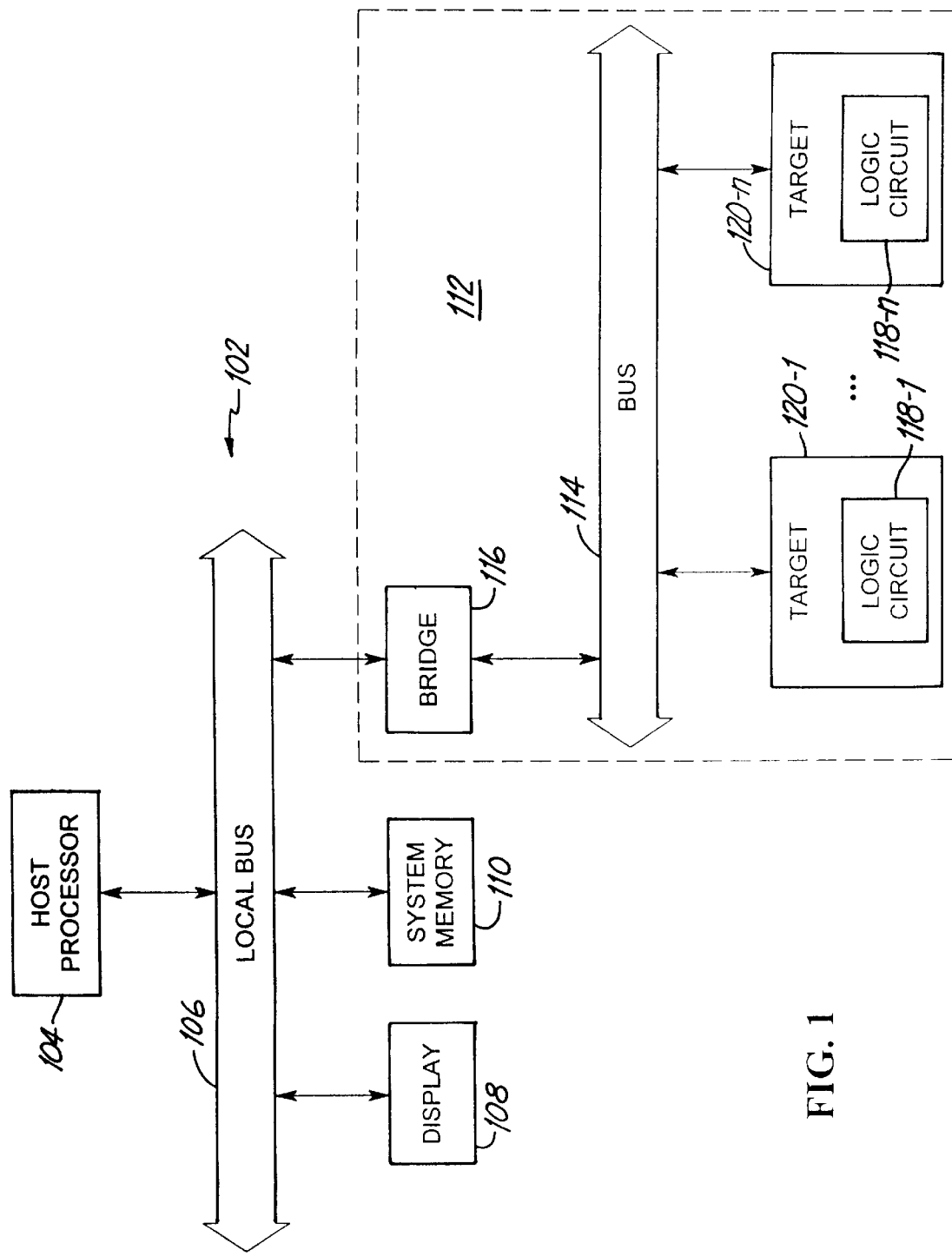
FIG. 1 is a functional block diagram of an example computer system according to one embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of systems and arrangements having logic circuit blocks coupled to a bus. The invention has been found to be particularly advantageous in application environments where a bridge is also coupled to the bus to provide input and output of data and control signals to and from the logic circuit blocks, both for normal operations and for scan testing. While the present invention is not so limited, an appreciation of various aspects of the invention is best gained through a discussion of application examples operating in such an environment.

FIG. 1 is a functional block diagram of a computer system 102 according to one embodiment of the invention. The computer system includes a host processor 104 coupled to a local bus 106, where the local bus 106 has various peripherals attached thereto. The exemplary peripherals coupled to the local bus 106 include display 108, system memory 110, and circuit block 112. The host processor 104, local bus 106, display 108, and system memory 110 are conventional components such as those typically included in a computer system using central processing units and/or chip sets available commercially, for example, from Intel, Texas Instruments, and Motorola.

Circuit block 112 is an example circuit in which the present invention may be used. With respect to computer system 102, circuit block 112 may implement any one of a variety of functions. Such functions include storage adapters, LAN adapters, graphics adapters, audio peripherals, video peripherals, and various other peripherals well-known to those skilled in the art. Circuit block 112 includes bus 114 and bridge 116 for coupling bus 114 to local bus 106. The predetermined function or functions provided by circuit block 112 are provided by logic circuits 118-1–188-n. The details of the function and/or functions provided by logic circuits 118-1–118-n are beyond the scope of the present invention. Each of the logic circuits 118-1–118-n is coupled to the bus 114 via a respective target circuit 120-1–120-n. The respective target circuits 120-1–120-n provide the interfaces between the logic circuits 118-1–118-n and the bus 114.

In one example embodiment, bus 114 is a bus that is internal to an integrated circuit relative to targets 120-1–120-n. In another embodiment, bus 114 may be external relative to target circuits 120-1–120-n. In still another embodiment, bus 114 is a PCI bus (Peripheral Component Interconnect) and bridge 116 is a PCI bridge.

The present invention provides the capability to scan test logic circuits 118-1–118-n via the bus 114 which is also used when the logic circuits 118-1–188-n are operating according to their functional designs. Thus, bus 114 may be used for both normal runtime operations of computer system 102 and for functional testing of logic circuits 118-1–118-n. With the invention, no special pins are required for scan testing the logic circuits 118-1–118-n. Scan control and data signals are input and output to and from the logic circuits 118-1–118n via the bus 114.

Figure 2:
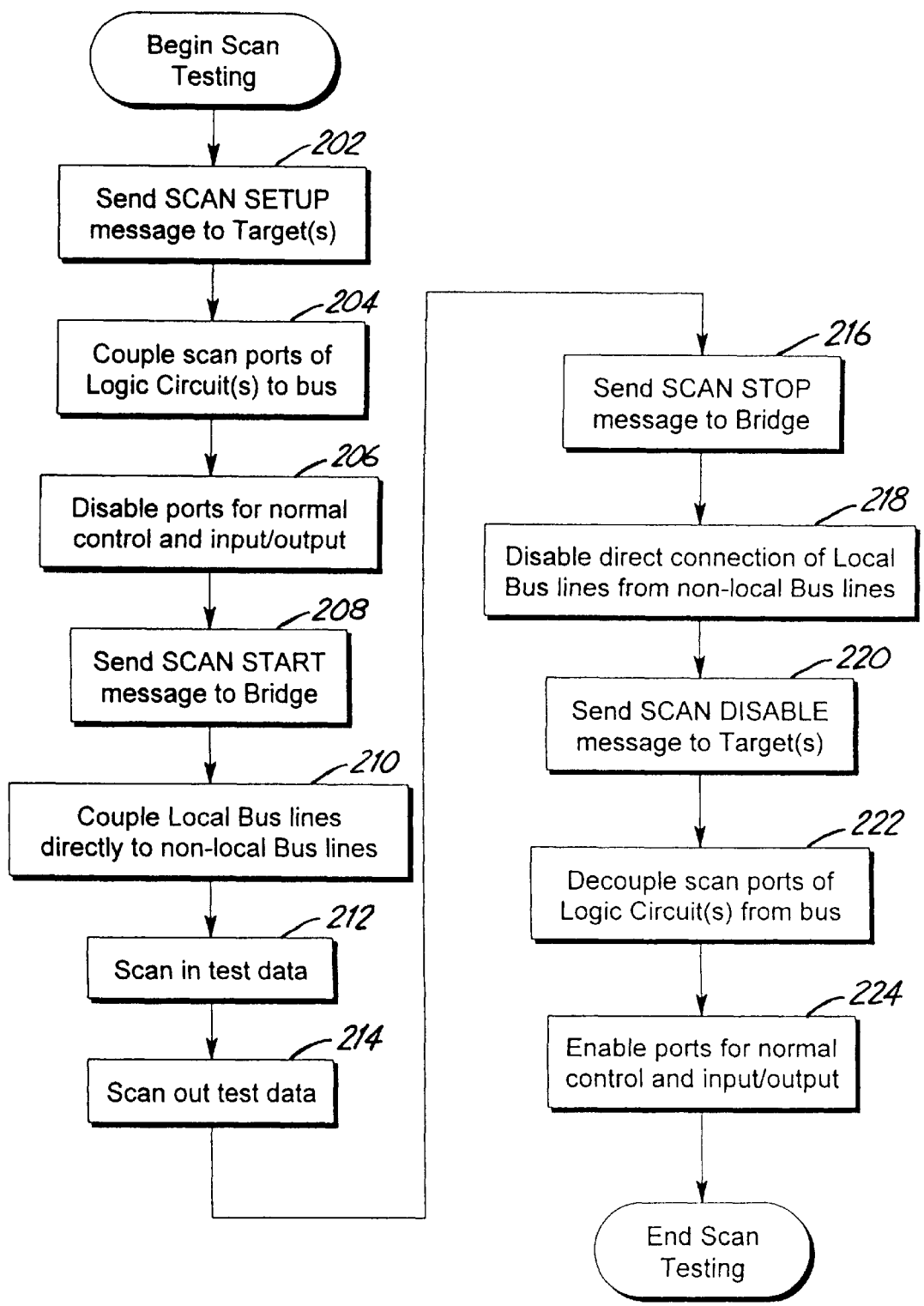
FIG. 2 is a flow chart of an example method for scan testing according to an embodiment of the present invention.

FIG. 2 is a flow chart of an example method for scan testing consistent with the present invention. The method of FIG. 2 is described in the context of the computer system 102 of FIG. 1. Processing begins at step 202 where a SCAN SETUP message is sent to the target circuits 120-1–120-n via the bus 114. The SCAN SETUP message causes scan test ports of the logic circuits 118-1–118n to be coupled to associated signal lines of the bus 114. Additionally, the normal clock signal port and the normal input/output/signal ports of the logic circuits 118-1–188-n are disabled for scan testing. During scan testing, normal bus operations, e.g., PCI functions, are suspended until a predetermined bus signal goes active, such as a PCI control class signal. Step 204 illustrates coupling the scan ports of the logic circuits 118-1–118n to the bus 114, and step 206 illustrates disabling normal input/output ports of the logic circuits 118-1–118n.

To provide scan test access to the bus 114, a SCAN START message is sent to the bridge 116 as illustrated by step 208. The SCAN START message causes lines of the local bus 106 to be directly coupled to associated lines of the bus 114. Step 210 illustrates coupling lines of the local bus 106 to lines of the bus 114 by the bridge 116.

Steps 212 and 214 illustrate scanning in and scanning out test data to and from the logic circuits 118-1–118-n for the purpose of testing the logic circuits. The particular data scanned in and testing sequence are dictated by the particular needs for testing logic circuits 118-1–118n. When scan testing is complete, the normal interfaces between the logic circuits 118-1–118n and the bus 114 are reestablished. Steps 216–222 illustrate the procedure for reestablishing the PCI connections.

At step 216, a SCAN STOP message is sent to the bridge 116. The bridge 116, in response, disables the direct coupling of lines of the local bus 106 from the associated lines of the bus 114 as illustrated by step 218. Next, a SCAN DISABLE message is sent to the target circuits 120-1–120n. The SCAN DISABLE message causes the target circuits 120-1–120n to decouple scan test ports of the logic circuits 118-1–118n from the associated lines in the bus, as illustrated by step 222. Additionally, the SCAN DISABLE message causes the target circuits 120-1–120n to enable input/output ports for functional operation of the logic circuits 118-1–118n, as illustrated at step 224.

By utilizing the signal lines of the bus 114 for scan testing the logic circuits 118-1–118n, and by using the bridge 116 as an interface to the circuit block 112, input/output pin resources are saved both on the circuit block 112 and on the logic circuits 118-1–118n. That is, because the bus 114 is used for scan testing, special scan test input/output pins are not required for the circuit block 112 or the target circuits 120-1–120-n.

Figure 3:
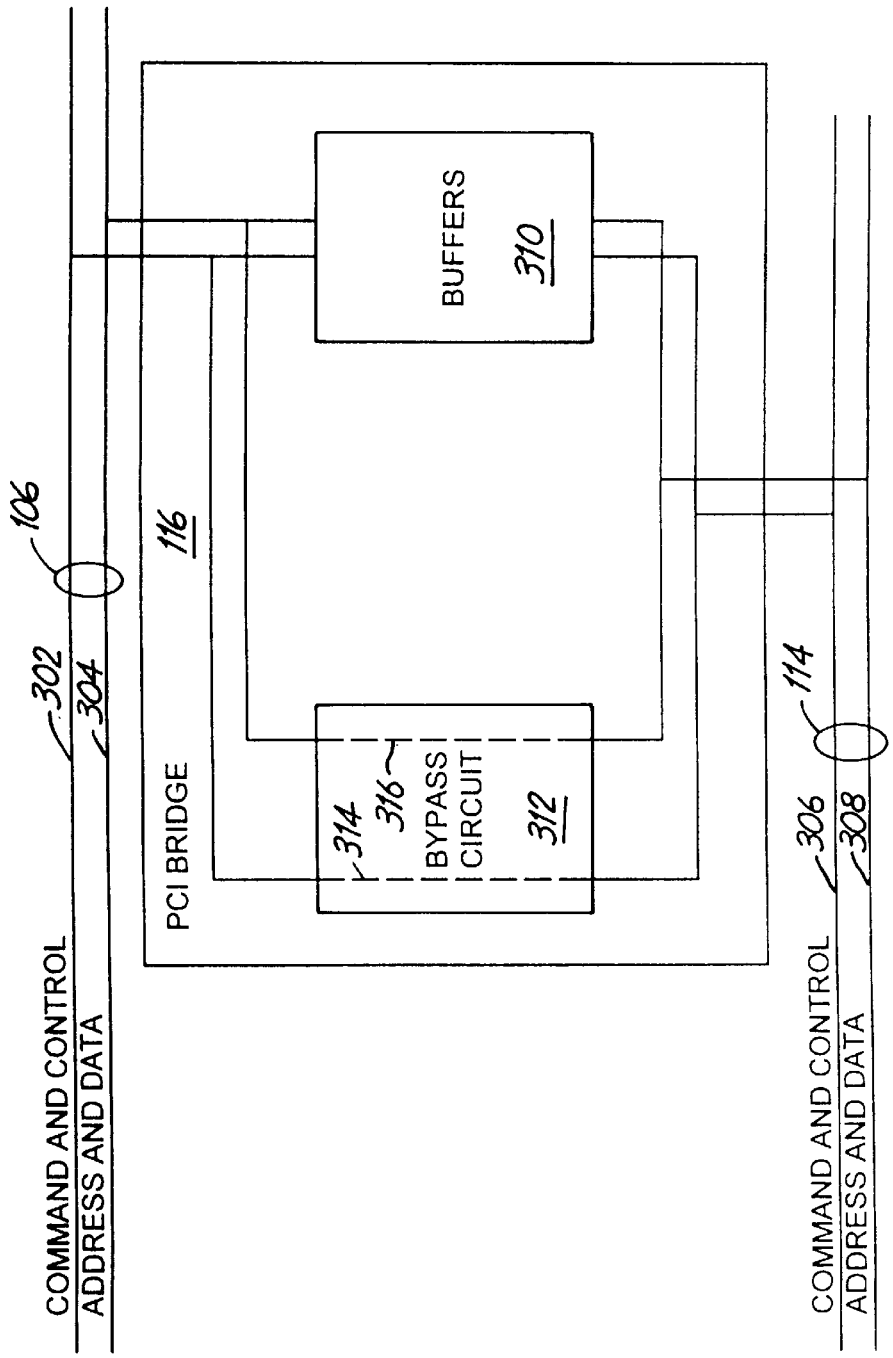
FIG. 3 is a functional block diagram of an example bridge arrangement according to an embodiment of the present invention.

FIG. 3 is a functional block diagram of a bridge 116. In an example embodiment, bridge 116 is a PCI bridge, such as that described in copending patent application entitled, "ADDRESS/DATA QUEUING ARRANGEMENT AND METHOD FOR PROVIDING HIGH DATA THROUGHPUT ACROSS BUS BRIDGE," to Ronald Lange, having Ser. No., 08/721,252, filed Sep. 26, 1996, assigned to the assignee of the present invention, and hereby incorporated by reference. The bridge 116 is coupled to command and control lines 302 and address and data lines 304 of local bus 106 and also coupled to command and control lines 306 and address and data lines 308 of bus 114. During normal operations of bus 114, bridge 116 directs command and control signals and address and data signals to buffers element 310. Buffers 310 are used for interfacing the local bus 106 to bus 114.

In response to a SCAN START message sent to the bridge 116, the bridge creates direct couplings between the lines of the local bus 106 and the bus 114. The exemplary bridge 116 includes a bypass circuit 312 for creating the direct couplings between the local bus 106 and the bus 114. Dashed line 314 in the bypass circuit 312 symbolizes that the bypass circuit 312 creates a direct coupling between the command and control lines 302 of the local bus 106 and the command and control lines 306 of the bus 114 in response to a SCAN START message. Similarly, dashed line 316 symbolizes that bypass circuit 312 creates a direct coupling between the address and data lines 304 of local bus 106 and the address and data lines 308 of bus 114 in response to the SCAN START message. When a SCAN STOP message is sent to the bridge 116, the bypass circuit 312 disables the direct coupling of the command and control lines 306 of bus 114 from the command and control line 302 of local bus 106 as well as the address and data lines 308 of bus 114 from the address and data lines 304 of local bus 106. Bypass circuit 312 may be implemented with circuitry that is similar to that described in the following FIGS.

Figure 4:
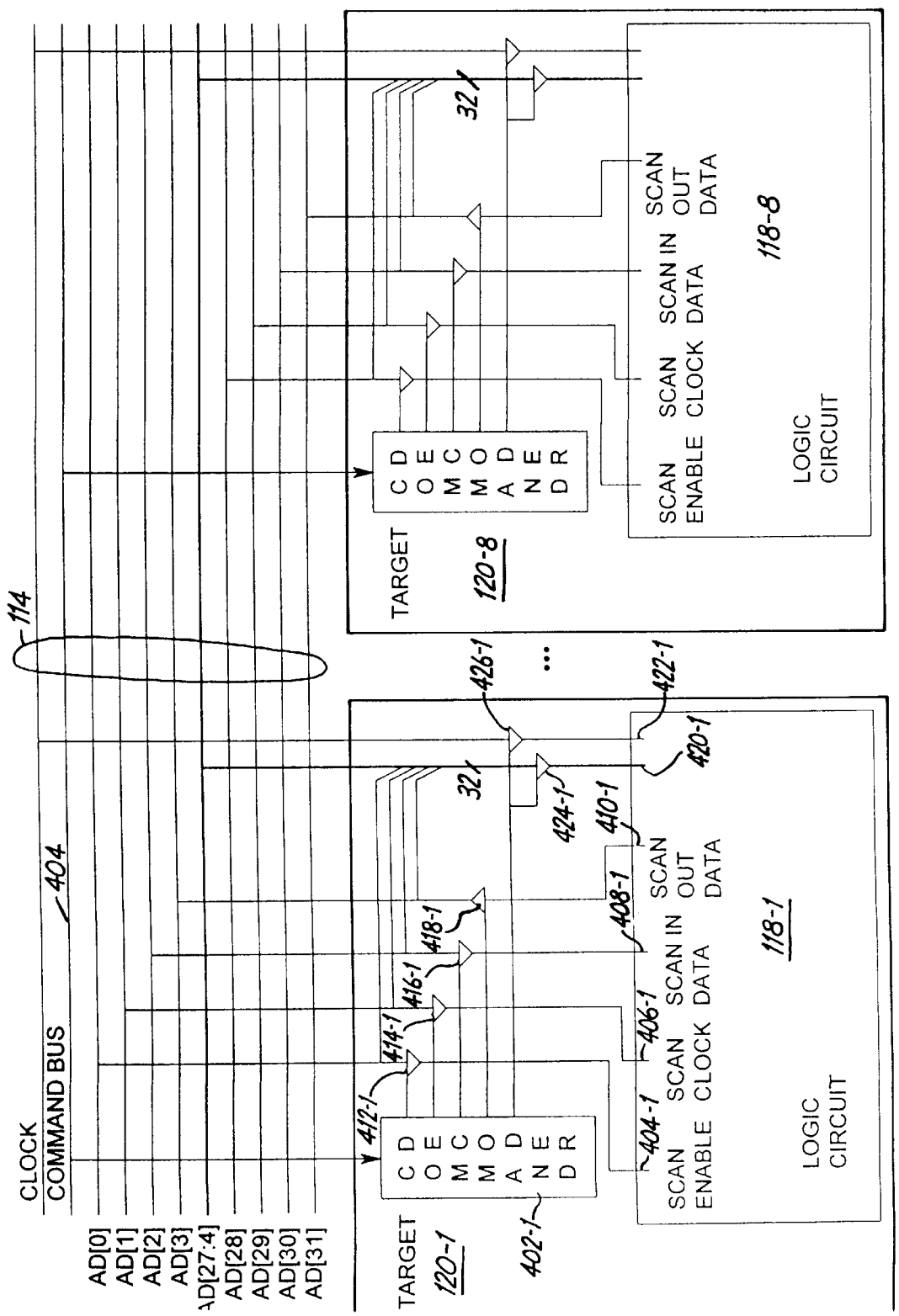
FIG. 4 is a functional block diagram of example circuitry for switchably coupling scan test ports of logic circuits to a bus, according to an embodiment of the present invention.

FIG. 4 is a functional block diagram of an example embodiment of circuitry for coupling scan test ports of logic circuits 118-1–118-8 to a bus 114. Each of the logic circuits 118-1 through 118-8 is associated with four address and data lines of bus 114 for the purpose of scan testing. For example logic circuit 118-1 has scan test ports coupled to address and data lines AD[3:0], and logic circuit 118-8 as scan test ports coupled to address and data lines AD[31:28]. During scan testing, the associated lines of the bus 114 are used for input of control and data signals and output of scan test data. When scan testing is complete, the scan test ports of the logic circuits 118-1 through 118-8 are decoupled from the associated address and data lines of the bus 114.

Each of the targets 120-1 through 120-8 includes a respective command decoder 402-1 through 402-8 which is coupled to the command bus lines 404 of the bus 114. Command decoder 402-1 switchably couples scan enable port 404-1, scan clock port 406-1, scan-in data port 408-1, and scan-out data port 410-1 of logic circuit 118-1 to address and data lines AD[0], AD[1], AD[2], and AD[3], respectively. In response to a SCAN SETUP message, the command decoder 402-1 turns on switches 412-1, 414-1, 416-1, and 418-1, thereby coupling the scan test ports of logic circuit 118-1 to the associated lines of the bus 114. Logic circuit 118-1 also includes input/output port 420-1 and clock port 422-1, both of which are coupled to respective lines of the bus 114. During scan testing, signals to and from the input/output port 420-1 and clock port 422-1 are disabled. The disabling of the normal inputs and outputs is accomplished via switches 424-1 and 426-1, both of which are controlled by command decoder 402-1. In response to a SCAN SETUP message, command decoder 402-1 turns off switch elements 424-1 and 426-1, thereby disabling inputs and outputs to and from the ports 420-1 and 422-1 of the logic circuit 118-1.

It should be noted that target circuit 120-8 operates in a manner which is similar to that of target circuit 120-1. However, the scan test ports of logic circuit 118-8 are switchably coupled to different associated address and data lines of the bus 114. Specifically, address and data lines AD[28], AD[29], AD[30], and AD[31] are dedicated to the scan test ports of logic circuit 118-8. In a like manner, predetermined ones of address and data lines AD[27:4] are respectively coupled to scan test ports of logic circuits 118-2 through 118-7. Note that logic circuits 118-2 through 118-7 are not shown in FIG. 4, but are represented by the ellipsis.

The exemplary circuitry of FIG. 4 provides for up to eight logic circuits. However, those skilled in the art will recognize that additional logic circuits may be coupled to the bus 114 for the purpose of scan testing if additional address and data lines are available.

Figure 5:
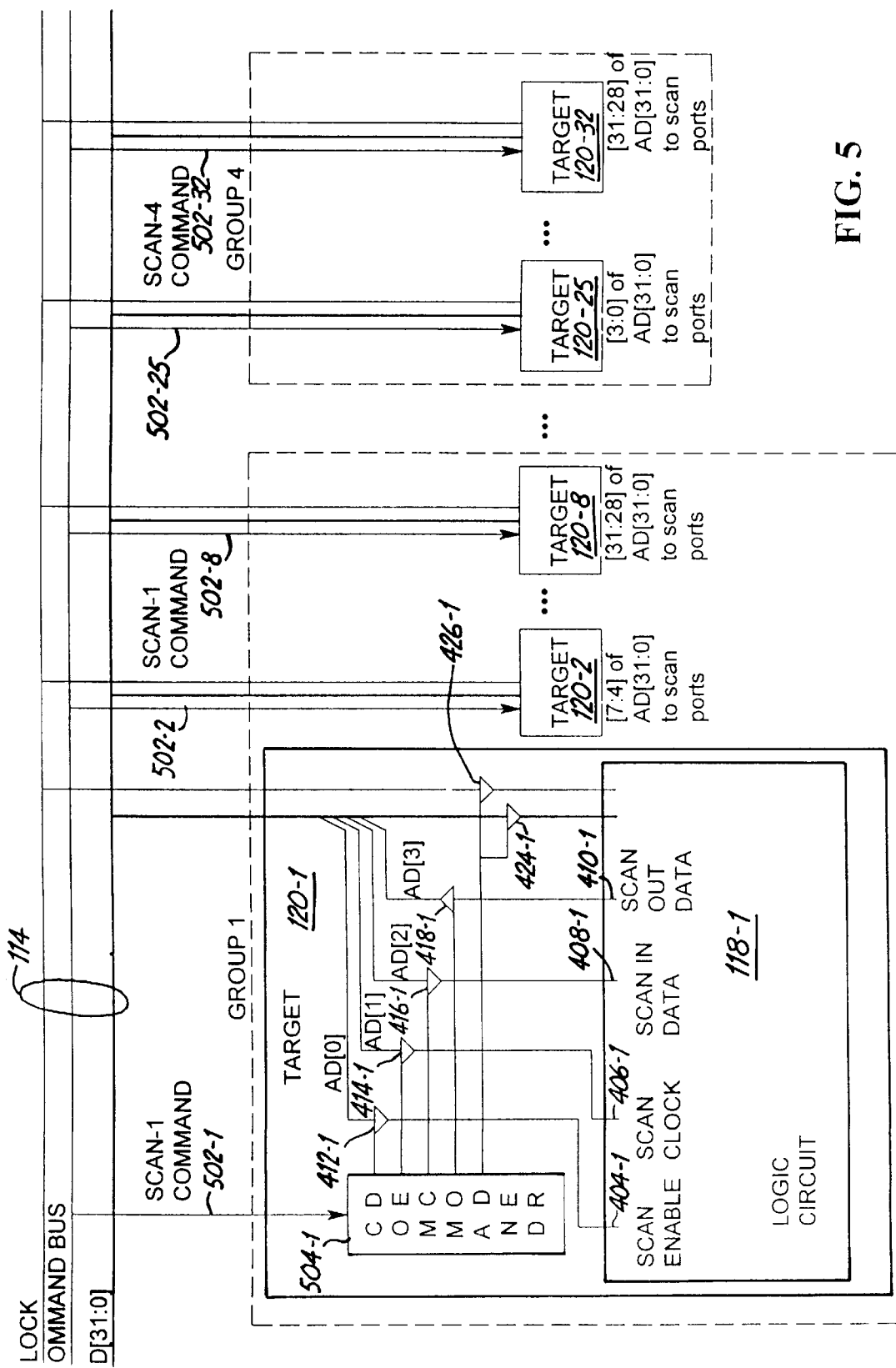
FIG. 5 is a functional block diagram of another example embodiment of circuitry for switchably coupling scan test ports of logic circuits to a bus.

FIG. 5 is a functional block diagram of another embodiment of circuitry for switchably coupling scan test ports of logic circuits to bus 114. The embodiment of FIG. 5 entails grouping the logic circuits 118-1 through 118-*n* and associated target circuits 120-1 through 120-*n* such that different groups of circuits are selectable for scan testing using different scan test commands. For example, target circuits 120-1 through 120-8 and the associated logic circuits 118-1 through 118-8 are included in group 1, and scan testing via bus 114 is controlled with a SCAN-1 type command input on command input lines 502-1 through 502-8. To enable scan testing of logic circuits 118-1 through 118-8 in group 1, a SCAN-1 SETUP message is input on command lines 502-1 through 502-8. Command decoder 504-1, for example, detects SCAN-1 type commands and switchably couples respective lines of the address and data bus to respective scan test ports 404-1, 406-1, 408-1, and 410-1 of the logic circuit 118-1. Specifically, SCAN ENABLE port 404-1 is switchably coupled to address data line AD[0], SCAN CLOCK port 406-1 is switchably coupled to address and data line AD[1], SCAN-IN DATA port 408-1 is switchably coupled to address and data line AD[2], and SCAN-OUT DATA port 410-1 is switchably coupled to address and data line AD[3]. Command decoder 504-1 is different from command decoder 402-1 of FIG. 4 in that command decoder 504-1 is responsive to SCAN-1 type commands which designate group 1. Target circuits 120-2–120-8 include command decoders which are functionally similar to command decoder 504-1. In contrast, target circuits 120-25–120-32 include command decoders that are responsive to SCAN-4 type commands. Target circuits of groups 2 and 3 (not shown) have command decoders that are responsive to SCAN-2 and SCAN-3 type commands, respectively.

Each group of target circuits uses all of the address and data lines of the bus 114 for scan test purposes. For example, logic circuit 118-1 uses address and data lines AD[3:0], logic circuit 118-2 (not shown) uses address and data lines AD[7:4], and logic circuit 118-8 (not shown) of target circuit 120-8 uses address and data lines AD[31:28]. Logic circuits 118-3 through 118-7 (not shown) similarly use respective groups of four of address and data lines AD[27:8]. Target circuits 120-9–120-16 of group 2 (not shown), target circuits 120-17–120-24 of group 3 (not shown), and target circuits 120-25–120-32 of group 4 are similarly coupled to address and data lines AD[31:0].

Figure 6B:
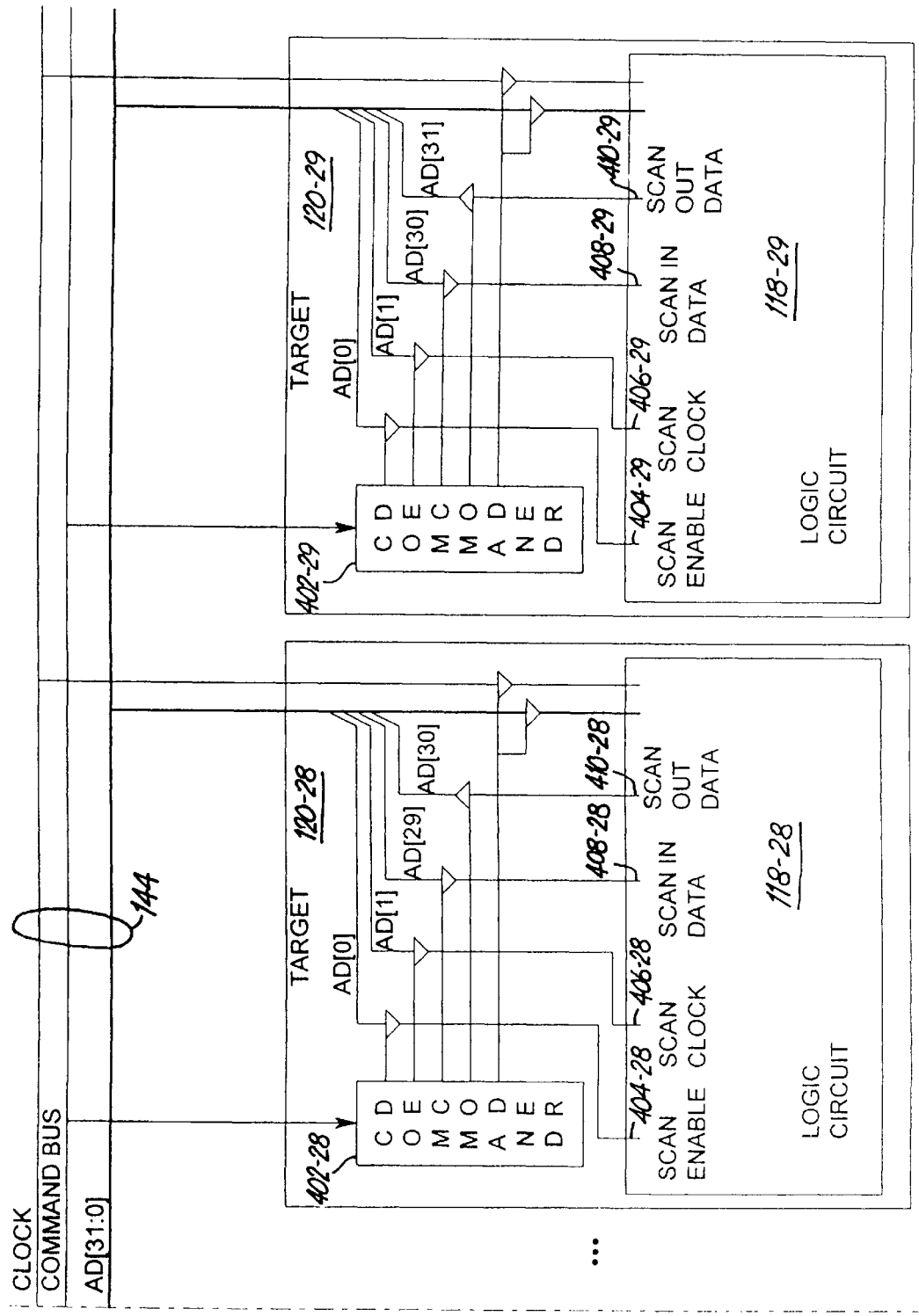
FIG. 6 shows the relationship between FIGS. 6A and 6B, which together form a functional block diagram of another example embodiment of circuitry for switchably coupling scan test ports of logic circuits to a bus.

FIG. 6 shows the relationship between FIGS. 6A and 6B, which together form a functional block diagram of another exemplary embodiment of circuitry for switchably coupling scan test ports of logic circuits to address and data lines of bus 114. For scan testing purposes, the SCAN ENABLE ports 404-1, 404-2, . . . , 404-28, and 404-29 are all switchably coupled to address and data line AD [0]. Similarly, SCAN CLOCK ports 406-1, 406-2, . . . 406-28, and 406-29 are all switchably coupled to address and data line AD[1]. Thus, logic circuits 118-1 through 118-29 share the same SCAN ENABLE and SCAN CLOCK input signals. Address and data lines AD[31:2] of bus 114 form a scan chain for the logic circuits 118-1 through 118-29. In particular, SCAN-IN DATA port 408-1 of logic circuit 118-1 is switchably coupled to address and data line AD [2], and SCAN-OUT DATA port 410-1 is switchably coupled to address and data line AD[3], which is also coupled to SCAN-IN DATA port 408-2 of logic circuit 118-2. The scan chain continues with SCAN-OUT DATA port 410-2 of logic circuit 118-2 being switchably coupled to address and data line AD[4], which is switchably coupled to SCAN-IN DATA port 408-3 of logic circuit 118-3 (not shown). SCAN-IN DATA port 408-$i$ of logic circuit 118-$i$ is switchably coupled to the same address and data line AD[j] as that which is switchably coupled to the SCAN-OUT DATA port 410-($i$–$1$) of logic circuit 118-($i$–1), except for a first one of the logic circuits. Command decoders 402-1 through 402-29 operate similarly to command decoders 402-1 through 402-8 of FIG. 4.

Other embodiments of the invention will be apparent to those skilled in the art from consideration of the specification and practice of the invention herein. It is intended that the embodiments discussed be considered as examples only, with a true scope and spirit of the invention being indicated by the following claims.

I claim:

1. A scan testable circuit arrangement, comprising:
   a bus;
   a plurality of logic circuits, each logic circuit having a plurality of scan test ports and a plurality input/output ports;
   a first plurality of switches, each having a first terminal coupled to a predetermined signal line of the bus and a second terminal coupled to a respective one of the scan test ports of the logic circuits;
   a second plurality of switches, each having a first terminal coupled to a predetermined signal line of the bus and a second terminal coupled to a respective one of input/output ports of the logic circuits;
   a plurality of command decoders, coupled to the bus to receive bus commands and coupled to the gates of the first and second plurality of switches, configured and arranged to couple the scan test ports to the bus for a first operational mode responsive to a first set of the bus commands, and couple the input/output ports to the bus for a second operational mode responsive to a second set of commands and
   a buffer circuit arranged to couple the bus to a local bus; and
   a bypass circuit coupled to the bus and arranged to couple the bus to the local bus and bypass the buffer circuit during the first operational mode.

2. The circuit arrangement of claim 1, wherein the first-recited bus is a PCI bus.

3. The circuit arrangement of claim 2, further comprising:
   a PCI bridge coupled to the PCI bus, the PCI bridge including the buffer circuit.

4. The circuit arrangement of claim 1, wherein the scan test ports of each of the logic circuits are switchably coupled to a respective predetermined set of lines of the bus.

5. The circuit arrangement of claim 1, wherein the logic circuits are organized into a plurality of groups, each group including predetermined ones of the logic circuits and predetermined ones of the command decoders, the first set of bus commands including respective codes for specifying each of the groups, and the command decoders being responsive to the respective codes, whereby each group is individually selectable for scan testing.

6. The circuit arrangement of claim 5, wherein the scan test ports of each of the logic circuits in a group are switchably coupled to a respective predetermined set of lines of the bus.

7. The circuit arrangement of claim 1, wherein the plurality of scan test ports include scan enable ports and scan clock ports, scan-in data ports, and scan-out data ports, the scan enable ports of the logic circuits switchably coupled to a first predetermined line of the bus, the scan clock ports of the logic circuits switchably coupled to a second predetermined line of the bus, the scan-in data port of a predetermined first one of the logic circuits switchably coupled to a third predetermined line of the bus, the scan-out data port of the first one of the logic circuits switchably coupled to a fourth predetermined line of the bus, the scan-in data port of each of the others of the logic circuits switchably coupled to the scan-out data port of another of the logic circuits via one of the lines of the bus, and the scan-output port of a predetermined last one of the logic circuits switchably coupled a fifth predetermined line of the bus.

8. A scan testable circuit arrangement, comprising:
   a bus;
   a plurality of logic circuits, each logic circuit having a plurality of scan test ports and a plurality input/output ports;
   interface means coupled to the bus and coupled to the scan tests ports and coupled to the input/output ports, the interface means for, during a test operational mode, coupling the scan test ports to the bus and decoupling the input/output ports from the bus, and, during a second operational mode, decoupling the scan test ports from the bus and coupling the input/output ports to the bus buffer circuit and
   bypass means coupled to the bus for, during the test operational mode, directly coupling predetermined lines of the bus to predetermined lines of an external bus and bypassing the buffer circuit, and during the second operational mode disabling the direct coupling of the predetermined lines of the bus to the predetermined lines of the external bus.

9. The circuit arrangement of claim 8, wherein the interface means includes means for decoding command codes received via the bus, the command codes indicative of the test operational mode and the second operational mode.

10. The circuit arrangement of claim 9, wherein the bus is a PCI bus.

11. The circuit arrangement of claim 10, further comprising a PCI bridge coupled to the bus, the bridge including the buffer circuit and bypass means.

12. A scan testable circuit arrangement, comprising:
   a PCI bus having a plurality of signal lines including a command signal line; and
   a plurality of PCI target circuits coupled to the PCI bus, each PCI target circuit including
     a logic circuit having a plurality of scan test ports and a plurality of PCI bus input/output ports, the logic circuit for performing a predetermined function;
     means for switchably coupling the scan test ports to associated lines of the PCI bus and decoupling the input/output ports from the PCI bus in response to a first predetermined command on the PCI bus;
     means for switchably coupling the PCI input/output ports to associated lines of the PCI bus and decoupling the scan test ports from the PCI bus in response to a second predetermined command; and
     coupled to the PCI bus a PCI bridge including a buffer circuit coupled to the PCI bus, and a bypass circuit coupled to the PCI bus for directly coupling the PCI bus to a second bus to bypass the buffer circuit in response to a second predetermined command.

13. The circuit arrangement of claim 12, wherein the scan test ports of each of the logic circuits are switchably coupled to a respective predetermined set of lines of the PCI bus.

14. The circuit arrangement of claim 12, wherein the logic circuits are organized into a plurality of groups, each group including predetermined ones of the logic circuits, a first set of bus commands including respective codes for specifying the groups, whereby each group is individually selectable for scan testing.

15. The circuit arrangement of claim 14, wherein the scan test ports of each of the logic circuits in a group are switchably coupled to a respective predetermined set of lines of the bus.

16. The circuit arrangement of claim 12, wherein the plurality of scan test ports include scan enable ports and scan clock ports, scan-in data ports, and scan-out data ports, the scan enable ports of the logic circuits switchably coupled to a first predetermined line of the bus, the scan clock ports of the logic circuits switchably coupled to a second predetermined line of the bus, the scan-in data port of a predetermined first one of the logic circuits switchably coupled to a third predetermined line of the bus, the scan-out data port of the first one of the logic circuits switchably coupled to a fourth predetermined line of the bus, the scan-in data port of each of the others of the logic circuits switchably coupled to the scan-out data port of another of the logic circuits via one of the lines of the bus, and the scan-output port of a predetermined last one of the logic circuits switchably coupled a fifth predetermined line of the bus.

17. A method for scan testing, comprising the steps of:
(a) transmitting via a first bus a first command code to logic circuits that are coupled to the first bus;
(b) coupling scan test ports of the logic circuits to the first bus in response to the first command code;
(c) decoupling input/output circuits of the logic circuits from the first bus in response to the first command code;
(d) inputting predetermined test data to the logic circuits via the first bus;
(e) outputting data resulting from a test via the first bus;
(f) transmitting via the first bus a second command code to the logic circuits;
(g) decoupling scan test ports of the logic circuits from the first bus in response to the second command code; and
(h) coupling input/output circuits of the logic circuits to the first bus in response to the second command code;
(i) transmitting a third command code to a bridge coupled to the first bus and the second bus,
(j) directly coupling predetermined lines of the first bus to predetermined lines of the second bus in response to the third command code; and
when testing is complete
(k) transmitting a fourth command code to the bridge; and
(l) decoupling the predetermined lines of the first bus from the predetermined lines of the second bus in response to the fourth command code.

18. The method of claim 17, wherein the coupling step (b) includes the steps of:
(m) coupling a scan enable port to a first predetermined line of the first bus;

(n) coupling a scan clock port to a second predetermined line of the first bus;
(o) coupling a scan-in data port to a third predetermined line of the first bus; and
(p) coupling a scan-out data port to a fourth predetermined line of the first bus.

19. The method of claim 18, wherein
the coupling step (m) includes the step of coupling all scan enable ports of the logic circuits to the first predetermined line of the bus;
the coupling step (n) includes the step of coupling all scan clock ports of the logic circuits to the second predetermined line of the bus;
the coupling steps (o) and (p) includes the steps of
coupling a first predetermined scan-in data port to the third predetermined line of the first bus;
coupling a last predetermined scan-out data port to the fourth predetermined line of the first bus; and
coupling others of the scan-in data ports to others of the scan-out data ports via other predetermined lines of the first bus.

20. The method of claim 18, wherein the decoupling step (g) includes the steps of:
(q) decoupling the scan enable port from the predetermined first line of the first bus;
(r) decoupling the scan clock port from the predetermined second line of the first bus;
(s) decoupling the scan-in data port from the predetermined third line of the first bus; and
(t) decoupling the scan-out data port from the predetermined fourth line of the first bus.

21. The method of claim 17, wherein the first command code includes a group designator code, and the coupling step (b) includes the steps of:
(u) decoding the group designator code in the first command code; and
(v) for logic circuits that are pre-assigned to a group designated by the group designator code, coupling scan test ports to the first bus.

22. The method of claim 17, wherein the first bus is a PCI bus.

23. A circuit arrangement for scan testing, comprising:
means for transmitting via a first bus a first command code to logic circuits that are coupled to the first bus;
means for coupling scan test ports of the logic circuits to the first bus in response to the first command code;
means for decoupling input/output circuits of the logic circuits from the first bus in response to the first command code;
means for inputting predetermined test data to the logic circuits via the bus;
means for outputting data resulting from a test via the first bus;
means for transmitting via the first bus a second command code to the logic circuits;
means for decoupling scan test ports of the logic circuits from the first bus in response to the second command code;
means for coupling input/output circuits of the logic circuits to the first bus in response to the second command code;
means for transmitting a third command code to a bridge coupled to the first bus and the second bus;

means for directly coupling predetermined lines of the first bus to predetermined lines of the second bus in response to the third command code; and wherein when testing is complete,
a fourth command code is transmitted to the bridge; and
the predetermined lines of the first bus are decoupled from the predetermined lines of the second bus in response to the fourth command code.

24. A scan-test circuit arrangement for switchably coupling a bus to a logic circuit arrangement, comprising:

a command decoder configured and arranged to couple to the bus to receive bus commands, a first set of the bus commands indicative of a first operational mode, and a second set of commands indicative of a second operational mode;

a scan enable switch coupled to the command decoder, and arranged to couple the bus to the logic circuit in the first operational mode;

a scan clock switch coupled to the command deocder, and arranged to couple the bus to the logic circuit in the first operational mode;

a scan-in data switch coupled to the command decoder, and arranged to couple the bus to the logic circuit in the first operational mode;

a scan-out data switch coupled to the command decoder, and arranged to couple the bus to the logic circuit in the first operational mode;

a normal data switch coupled to the command decoder, and arranged to couple the bus to the logic circuit in the second operational mode; and a normal clock switch coupled to the command decoder, and arranged to couple the bus to the logic circuit in the second operational mode.

25. The circuit arrangement of claim 24, wherein, the scan enable switch is arranged to decouple the bus from the logic circuit in the second operational mode;

the scan clock switch is arranged to decouple the bus from the logic circuit in the second operational mode;

the scan-in data switch is arranged to decouple the bus from the logic circuit in the second operational mode;

the scan-out data switch is arranged to decouple the bus from the logic circuit in the second operational mode;

the normal data switch is arranged to decouple the bus from the logic circuit in the first operational mode; and the normal clock switch is arranged to decouple the bus from the logic circuit in the first operational mode.

* * * * *